(12) United States Patent
Millmore et al.

(10) Patent No.: US 8,775,327 B2
(45) Date of Patent: Jul. 8, 2014

(54) COMBINED DIRECTORY OF PERSONAL AND ENTERPRISE APPLICATION SYSTEM DATA

(75) Inventors: Martin Millmore, Reading (GB); Dinesh Arora, Cupertino, CA (US); Michael Rossi, Manhattan Beach, CA (US); Aaron Green, San Francisco, CA (US); Paul Brimble, Yelverton (GB)

(73) Assignee: Oracle International Corporation, Redwood Shores, CA (US)

( * ) Notice: Subject to any disclaimer, the term of this patent is extended or adjusted under 35 U.S.C. 154(b) by 1597 days.

(21) Appl. No.: 12/167,641

(22) Filed: Jul. 3, 2008

(65) Prior Publication Data

US 2010/0005098 A1 Jan. 7, 2010

(51) Int. Cl.
*G06Q 10/00* (2012.01)
*G06Q 10/10* (2012.01)
*G06Q 10/06* (2012.01)

(52) U.S. Cl.
CPC ............ *G06Q 10/105* (2013.01); *G06Q 10/06* (2013.01)
USPC ........................................................ 705/320

(58) Field of Classification Search
USPC ........................................................ 705/320
See application file for complete search history.

(56) References Cited

U.S. PATENT DOCUMENTS

| | | | |
|---|---|---|---|
| 6,360,222 B1* | 3/2002 | Quinn | 1/1 |
| 6,389,372 B1* | 5/2002 | Glance et al. | 702/189 |
| 6,747,677 B2* | 6/2004 | Millmore | 715/772 |
| 6,832,245 B1* | 12/2004 | Isaacs et al. | 709/206 |
| 7,080,104 B2* | 7/2006 | Ring et al. | 1/1 |
| 7,167,910 B2* | 1/2007 | Farnham et al. | 709/223 |
| 7,197,741 B1 | 3/2007 | Stapf | |
| 7,383,355 B1* | 6/2008 | Berkman et al. | 709/246 |
| 7,530,021 B2* | 5/2009 | Cheng et al. | 715/753 |
| 7,539,697 B1* | 5/2009 | Akella et al. | 1/1 |
| 2002/0147961 A1* | 10/2002 | Charters et al. | 717/101 |
| 2006/0173985 A1 | 8/2006 | Moore | |
| 2006/0242234 A1* | 10/2006 | Counts et al. | 709/204 |
| 2007/0067725 A1 | 3/2007 | Cahill et al. | |
| 2007/0156809 A1 | 7/2007 | Dickinson et al. | |
| 2007/0208751 A1 | 9/2007 | Cowan et al. | |
| 2007/0299881 A1* | 12/2007 | Bouganim | 707/200 |
| 2009/0031245 A1* | 1/2009 | Brezina et al. | 715/781 |

* cited by examiner

*Primary Examiner* — Traci Casler
(74) *Attorney, Agent, or Firm* — Miles & Stockbridge P.C.

(57) ABSTRACT

Systems and methods are provided that combine private contact information and Enterprise Application System ("EAS") data in a directory. An embodiment includes receiving private contact information regarding a first employee from a second employee, storing the private contact information regarding the first employee on an EAS server, and displaying the private contact information to the second employee upon request, wherein the private contact information is viewable only to the second employee.

21 Claims, 4 Drawing Sheets

303

Pat Miller 📶 RSS 🏷 Tags

Pat is writing a Design Doc
📇 Add to my address book

E-Mail pat.miller@oracle.com
Work Phone 777 712 3795
Home Phone 714 765 9390
Mobile Phone 871 604 8917
Chat 💬 pat.miller

301

Supervisor Anna Pascal
Location San Francisco, CA
Work Country US
Job Accountant
Time 17:41:19 PST

| Person Details | | | | | |
|---|---|---|---|---|---|
| Contact Mesh | | Filler | | Private Information | ✏️ |
| | | | | Home Phone 456 321 4221 | |
| | | | | Mobile Phone 234 789 0291 | |
| | | | | Rss Feeds | |

(Rotated page, content 301)

Pat Miller 📶RSS 🏷 Tags

Pat is writing a Design Doc
📧 Add to my address book

303

E-Mail pat.miller@oracle.com
Work Phone 777 712 3795
Home Phone 714 765 9390
Mobile Phone 871 604 8917
Chat 💬 pat.miller Supervisor Anna Pascal
Location San Francisco, CA
Work Country US
Job Accountant
Time 17:41:19 PST Person Details Contact Mesh                Filter Private Information
Home Phone    456 321 4221
Mobile Phone  234 789 0291
Rss Feeds

305

COMBINED DIRECTORY OF PERSONAL AND ENTERPRISE APPLICATION SYSTEM DATA

FIELD OF THE INVENTION

One embodiment is directed generally to Enterprise Application ("EAS") systems, and in particular to a combined directory of personal contact information and EAS data.

BACKGROUND INFORMATION

Enterprise Application Systems are typically integrated software applications that perform business functions such as accounting, production scheduling, customer information management, human capital management, etc. They are frequently implemented on servers and simultaneously provide services to a large number of users, typically over a computer network. These systems are in contrast to the more common single-user software applications which run on a user's own local computer and serve only one user at a time. Typically, the Enterprise Application System ("EAS") is implemented as a group of software modules sharing a common database. Examples of an EAS include a Customer Relations Management ("CRM") system, a Manufacturing Resource Planning ("MRP") system, and an Enterprise Resource Planning ("ERP") system.

Enterprise Resource Planning is an industry term for integrated, multi-module application software packages that are designed to serve and support multiple business functions. An ERP system can include software for manufacturing, order entry, accounts receivable and payable, general ledger, purchasing, warehousing, transportation and human resources. Evolving out of the manufacturing industry, ERP implies the use of packaged software rather than proprietary software written by or for one customer. ERP modules may be able to interface with an organization's own software with varying degrees of effort, and, depending on the software, ERP modules may be alterable via the vendor's proprietary tools as well as proprietary or standard programming languages.

One module of the ERP system that enjoys widespread use is the human resources module. Through the human resources module employees of the organization typically have access to fellow employee's contact information, such as e-mail address, phone number, office location and so on through a worker directory. Data held in an ERP system is kept up to date, for example, when e-mail addresses or phone numbers are changed. However, if the employee knows more information about their fellow employees than is stored in the corporate directory, including private information such as cell phone numbers or home addresses, they would typically store this in a contact application such as Microsoft® Outlook. The conventional ERP system does not allow non-administrators to access or add to the ERP system. That means that the employee has to look in two places to find the complete set of information about their colleague. One way of dealing with this problem is to copy the ERP contact details into the Outlook contact list. However, then there is a risk of having out-of-date information, as the information is no longer linked and updated from the ERP system.

SUMMARY OF THE INVENTION

One embodiment is a method for combining private contact information and enterprise application system data in a directory. The method includes receiving private contact information regarding a first employee from a second employee, storing the private contact information regard the first employee on an EAS server, and displaying the private contact information to the second employee upon request, wherein the private contact information is viewable only to the second employee.

BRIEF DESCRIPTION OF THE DRAWINGS

FIG. 3 illustrates a work directory user interface;

DETAILED DESCRIPTION

Figure 1:
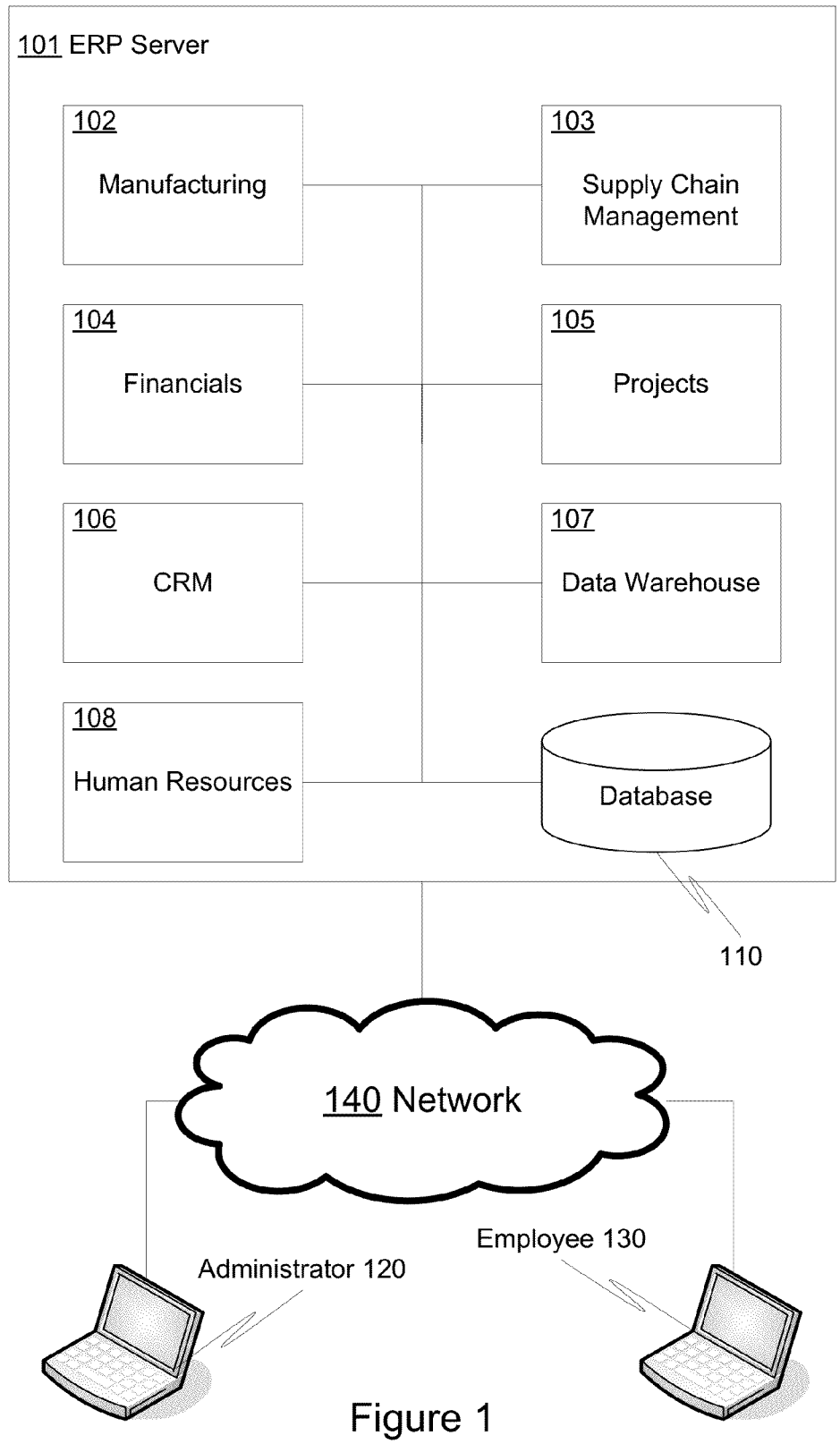
FIG. 1 is a block diagram of an ERP system in accordance with an embodiment.

An embodiment is a method for combining private contact information and EAS data in the same directory. In one embodiment, the EAS data and contact information are stored on an ERP server. FIG. 1 is a block diagram of an ERP server 101 in accordance with this embodiment. ERP is a software architecture that facilitates the flow of information among the different functions within an enterprise. Similarly, ERP facilitates information sharing across organizational units and geographical locations. It enables decision-makers to have an enterprise-wide view of the information they need in a timely, reliable and consistent fashion. ERP provides the backbone for an enterprise-wide information system. At the core of this enterprise software is a central database that draws data from and feeds data into modular applications that operate on a common computing platform, thus standardizing business processes and data definitions into a unified environment. With an ERP system, data needs to be entered only once. The system provides consistency and visibility or transparency across the entire enterprise. A primary benefit of ERP is easier access to reliable, integrated information. A related benefit is the elimination of redundant data and the rationalization of processes, which result in substantial cost savings.

In one embodiment, ERP server 101 is implemented as part of the Oracle® E-Business Suite. ERP server 101 includes a processor (not shown) for executing instructions and a memory (not shown) for storing an operating system and software modules executable by the processor. ERP server 101 is accessible by at least one administrator 120 and at least one employee 130 via, for example, network 140. ERP server 101 includes a plurality of modules 102-108 and a central database 110 including data collected, utilized and reported by modules 102-108. Manufacturing module 102 collects, utilizes and reports data relating to manufacturing engineering, bills of material, scheduling, capacity, workflow management, quality control, cost management, manufacturing process, manufacturing projects, and manufacturing flow, among other aspects. Supply Chain Management module 103 collects, utilizes and reports data relating to inventory, order entry, purchasing, supply chain planning, supplier scheduling, inspection of goods, claim processing, and commission calculation, among other aspects. Financials module 104 collects, utilizes and reports data relating to general ledgers, cash management, accounts payable, accounts receivable, and assets, among other aspects. Projects module 105 collects, utilizes and reports data relating to costing, billing, and time and expenses of projects, employee activity on a project, among other aspects. Customer Relationships Management module 106 collects, utilizes and reports data relating to sales and marketing, commissions, service, customer contact, and call center support, among other aspects. Data Warehouse module 107 includes interfaces for suppliers, customers, and employees to access a data warehouse. Human Resources module 108 collects, utilizes and reports data relating to position management, performance review, applicant tracking, payroll, training, time and attendance, and benefits, among other aspects. Human Resources module 108 is described in greater detail below.

Figure 2:
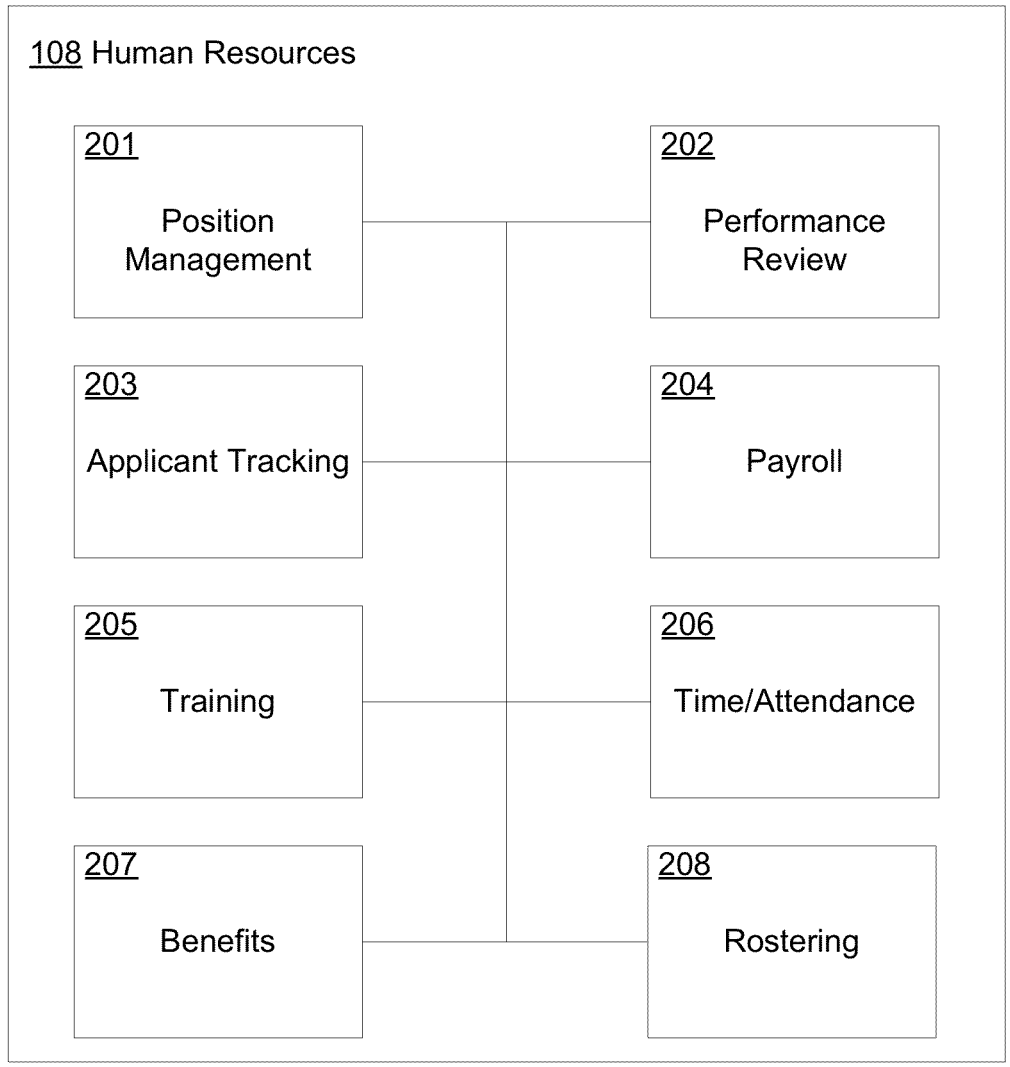
FIG. 2 is a block diagram of a human resources module in accordance with an embodiment.

FIG. 2 is a block diagram of Human Resources module 108 in accordance with an embodiment. Human Resources module 108 includes a plurality of modules 201-207 that collect, utilize and report data relating to human resources. Position Management module 201 collects, utilizes and reports data relating to positions held by employees within the organization, and any change in those positions, among other aspects. Performance Review module 202 collects, utilizes and reports data relating to performance evaluations of employees within an organization, for example, as the evaluations relate to promotion or compensation, among other aspects. Applicant Tracking module 203 collects, utilizes and reports data relating to potential candidates for employment within the organization, among other aspects. Payroll module 204 collects, utilizes and reports data relating to employ compensation within the organization, among other aspects. Training module 205 collects, utilizes and reports data relating to continuing education courses available to employees, and which employees have completed such courses, among other aspects. Time and Attendance module 206 collects, utilizes and reports data relating to hours worked, days present, sick leave, and vacation leave for employees within the organization, among other aspects. Benefits module 207 collects, utilizes and reports data relating to employee benefits, for example, health and dental insurance, transit benefits, pension and retirement programs, and profit sharing programs, among other aspects.

Human Resources module 108 further includes a rostering module 208 for collecting, maintaining and displaying contact information for employees in the organization. This information, stored in database 110, typically includes but is not limited to work email, work phone, office location, title, supervisor, a picture of the employee, a public work calendar, social security number, home address, home phone, mobile phone, and emergency contact information. This information may be changed or created only by permitted personnel, such as a human resources administrator. When an employee 130 accesses the rostering module 208 to retrieve contact information for a coworker, for example, via an organizational intranet, the employee 130 receives a limited view of the information. Typically, this information is limited to organizational information such as work email, work phone, office location, title, supervisor, public work calendar, and picture of the coworker. A human resources administrator 120 may configure which information should be displayed to coworkers.

In addition to this information, employee 130 sees private contact information about their coworker that the employee added via the rostering module 208. FIG. 3 illustrates a directory user interface ("UI") 301 displaying public organizational information 303 and private contact information 305. For example, if employee 130 knows the private home phone, home address, and/or mobile phone of coworker A, then employee 130 adds that private contact information 305 to database 110 via rostering module 208. The private contact information 305 regarding coworker A is visible and accessible only to the person that added it, that is, employee 130. However, employee 130 may also grant permissions to other employees to allow them to see the data also, and push that data (send an alert) to other employees when that data changes or is updated. One or ordinary skill in the art will also understand that network administrator 120 could likely have access to the private contact information.

Furthermore, because the private contact information 305 is stored on ERP server 101, the private contact information enjoys the benefit of the periodic archiving of database 110. When employee 130 views their own contact information, they see all of the information collected by rostering module 208, and may select which private information to make public via rostering module 208.

Figure 4:
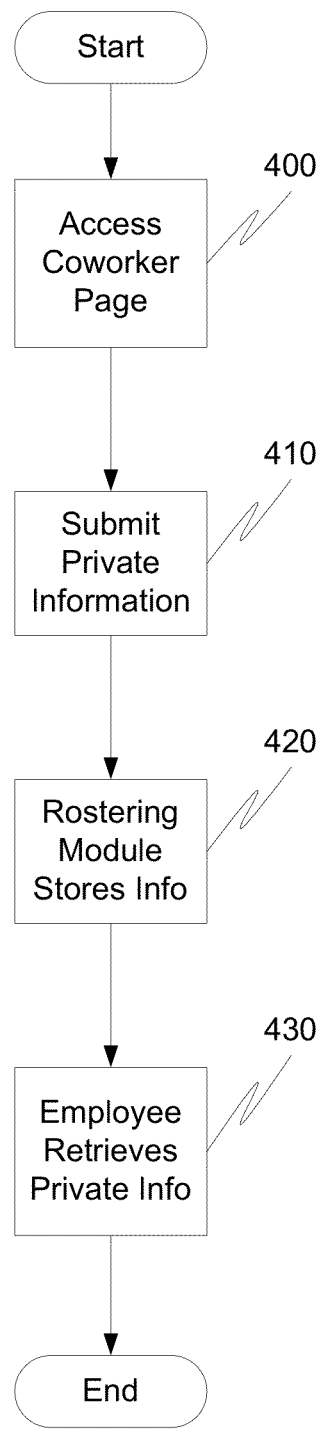
FIG. 4 is a flow chart illustrating a method for combining private contact information and ERP data.

FIG. 4 illustrates a flow diagram of the functionality of ERP server 101 in accordance with an embodiment when combining personal contact information and ERP data. In one embodiment, the functionality of the flow diagram of FIG. 4 is implemented by software stored in memory and executed by a processor. In other embodiments, the functionality can be performed by hardware, or any combination of hardware and software. An employee 130 accesses a coworker's organizational information on ERP server 101 via, for example, an intranet page (400). That page includes a limited view of organizational information regarding the coworker. Employee 130 submits, via the page, private contact information 305 regarding the coworker (410). For example, employee 130 submits a home phone number for the coworker, acquired from the coworker. In one embodiment, employee 130 selects a group of users who are allowed to view the private contact information. In an embodiment, that group of users may be limited to employee 130. Rostering module receives the private contact information and stores it securely in database 110 (420). Subsequently, employee 130 returns to the coworker's intranet page and views the private contact information 305 (430). The private contact information is not retrievable by anyone else in the organization that is not permitted to see it.

In the past, people had to have a separate repository for their personal data about another person and the ERP data held by the organization about the person. This meant either visiting two or more sources to find the complete set of information, or holding information in multiple places, which led to it often getting out of date. This embodiment allows both organization and private information about a person to be stored in a single place. By having all of the data in a single repository, synchronization of data to mobile phones is also simplified, without the user having to worry about duplicate information from different sources. Furthermore, because the data is stored on the ERP server, the private contact information is securely stored and archived, thus the information is less likely to be exposed or lost. Moreover, users may alert others that their contact information has changed.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A computer-implemented method for combining private contact information and enterprise application system (EAS) data for an enterprise in a directory, comprising:

receiving at a processor private contact information regarding a first employee from a second employee;

storing by the processor the private contact information regarding the first employee on a human resources module of an EAS server, the human resources module further storing public contact information regarding the first employee that can be edited only by selected human resources administrators, wherein the public contact information regarding the first employee is viewable by users of the EAS, wherein the storing is in response to a request from the second employee and the second employee is not a selected human resource administrator;

displaying on a first user interface the private contact information of the first employee together with the public contact information of the first employee to the second employee and to a selected group of users authorized to view the private contact information, the selected group of users selected by the second employee, wherein the second employee is one of the users of the EAS and is not authorized to edit the public contact information regarding the first employee;

wherein the displaying on the first user interface is in response to a request for contact information of the first employee from the second employee or from one of the selected group of users; and in response to a request for contact information of the first employee from a requester that is not the second employee and not from one of the selected group of users, displaying on a second user interface the public contact information of the first employee and not displaying the private contact information.

2. The method of claim 1, wherein the selected group of users comprises no users.

3. The method of claim 1, wherein the EAS data is enterprise resource planning (ERP) data and the EAS server is an ERP server.

4. The method of claim 1, wherein the private contact information includes at least one of a home phone number, a home address, a mobile phone number, or an email address.

5. The method of claim 1, wherein the first employee chooses information to be public information or private contact information.

6. The method of claim 1, wherein the private contact information is stored with EAS data.

7. The method of claim 1, further comprising displaying the private contact information with public EAS data.

8. The method of claim 1, further comprising periodically archiving the EAS server, including the private contact information.

9. A non-transitory computer-readable medium having instructions stored thereon that, when executed by a processor, cause the processor to combine private contact information and enterprise application system (EAS) data in a directory, the instructions comprising:

receiving private contact information regarding a first employee from a second employee;

storing the private contact information regarding the first employee on a human resources module of an EAS server, the human resources module further storing public contact information regarding the first employee that can be edited only by selected human resources administrators, wherein the public contact information regarding the first employee is viewable by users of the EAS, wherein the storing is in response to a request from the second employee and the second employee is not a selected human resource administrator;

displaying on a first user interface the private contact information of the first employee together with the public contact information of the first employee to the second employee and to a selected group of users authorized to view the private contact information, the selected group of users selected by the second employee, wherein the second employee is one of the users of the EAS and is not one of the selected human resources administrators;

wherein the displaying on the first user interface is in response to a request for contact information of the first employee from the second employee or from one of the selected group of users; and in response to a request for contact information of the first employee from a requester that is not the second employee and not from one of the selected group of users, displaying on a second user interface the public contact information of the first employee and not displaying the private contact information.

10. The computer-readable medium of claim 9, wherein the selected group of users comprises no users.

11. The computer-readable medium of claim 9, wherein the EAS data is enterprise resource planning (ERP) data and the EAS server is an ERP server.

12. The computer-readable medium of claim 9, wherein the private contact information includes at least one of a home phone number, a home address, a mobile phone number, or an email address.

13. The computer-readable medium of claim 9, further comprising displaying the private contact information with public EAS data.

14. A system for combining private contact information and enterprise application system (EAS) data in a directory, comprising:

a human resources module of an EAS server that receives private contact information regarding a first employee from a second employee, stores the private contact information regarding the first employee on an EAS database, and transmits the private contact information to a selected group of users authorized to view the private contact information upon request; and a computer console operable by the second employee to submit the private contact information;

the human resources module further storing public contact information regarding the first employee that can be edited only by selected human resources administrators, wherein the public contact information regarding the first employee is viewable by users of the EAS, wherein the storing of the private contact information is in response to a request from the second employee and the second employee is not a selected human resource administrator;

wherein the selected group of users is selected by the second employee, and the second employee is one of the users of the EAS and is not authorized to edit the public contact information regarding the first employee;

wherein the system displays on a first user interface the private contact information of the first employee together with the public contact information of the first employee to the second employee and to the selected group of users;

wherein the displaying on the first user interface is in response to a request for contact information of the first employee from the second employee or from one of the selected group of users; and in response to a request for contact information of the first employee from a requester that is not the second employee and not from one of the selected group of users, the system displays on a second user interface the public contact information of the first employee and not displaying the private contact information.

15. The system of claim 14, wherein the selected group of users comprises no users.

16. The system of claim 14, wherein the EAS data is enterprise resource planning (ERP) data and the EAS server is an ERP server.

17. The system of claim 14, wherein the private contact information includes at least one of a home phone number, a home address, a mobile phone number, and an email address.

18. The system of claim 14, wherein the private contact information is displayed with public EAS data.

19. A system for combining private contact information and enterprise application system (EAS) data in a directory, comprising:
- means for receiving private contact information regarding a first employee from a second employee;
- means for storing the private contact information regarding the first employee a human resources module of an EAS server, the human resources module further storing public contact information regarding the first employee that can be edited only by selected human resources administrators, wherein the public contact information regarding the first employee is viewable by users of the EAS, wherein the storing is in response to a request from the second employee and the second employee is not a selected human resource administrator;
- means for displaying on a first user interface the private contact information of the first employee together with the public contact information of the first employee to the second employee and to a selected group of users authorized to view the private contact information, the selected group of users selected by the second employee, wherein the second employee is one of the users of the EAS and is not one of the selected human resources administrators;
- wherein the displaying on the first user interface is in response to a request for contact information of the first employee from the second employee or from one of the selected group of users; and
- in response to a request for contact information of the first employee from a requester that is not the second employee and not from one of the selected group of users, displaying on a second user interface the public contact information of the first employee and not displaying the private contact information.

20. The system of claim 19, wherein the selected group of users comprises no users.

21. The system of claim 19, wherein the EAS data is enterprise resource planning (ERP) data and the EAS server is an ERP server.

* * * * *